(12) United States Patent
McLeish et al.

(10) Patent No.: US 6,592,994 B2
(45) Date of Patent: Jul. 15, 2003

(54) THERMOSETTING EPOXY POWDER COATINGS HAVING IMPROVED DEGASSING PROPERTIES

(75) Inventors: Tabitha Lynn McLeish, Reading, PA (US); William George Ruth, Morgantown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/015,124

(22) Filed: Oct. 26, 2001

(65) Prior Publication Data

US 2002/0082321 A1 Jun. 27, 2002

Related U.S. Application Data

(60) Provisional application No. 60/246,654, filed on Nov. 8, 2000.

(51) Int. Cl.$^7$ ............................................... B32B 15/08
(52) U.S. Cl. ....................... 428/418; 427/475; 525/523; 528/93
(58) Field of Search .......................... 428/418; 528/93; 525/523; 427/475

(56) References Cited

U.S. PATENT DOCUMENTS

| | | | |
|---|---|---|---|
| 3,849,366 A | 11/1974 | Patrick | 260/37 |
| 4,360,649 A | 11/1982 | Kamio et al. | 525/484 |
| 5,414,058 A | 5/1995 | Ono et al. | 525/523 |
| 5,721,052 A | 2/1998 | Muthiah et al. | 428/413 |
| 6,329,473 B1 | 12/2001 | Marten et al. | 525/438 |
| 6,346,573 B1 | 2/2002 | White | 525/121 |

FOREIGN PATENT DOCUMENTS

| | | |
|---|---|---|
| EP | 0 742 272 A1 | 11/1996 |
| JP | 58187422 | * 1/1983 |

OTHER PUBLICATIONS

2296 Journal of Applied Polymer Science, 50(1993) Nov. 20, No. 8, "Curing of Epoxy Resins with Dicyandiamide and Urones", Thomas Guthner and Benedikt Hammer, pp. 1453–1459.

Journal of Applied Polymer Science, vol. 69, 2487–2497(1998), Curing of Dicyandiamide Epoxy Resins Accelerated with Substituted Ureas, N. Poisson, A. Maazouz, H. Sautereau, M. Taha, X. Gambert.

CVC Specialty Chemicals, Inc. Jan. 1999; Omicure® U410 Technical Grade of Toluene Bis Dimethyl Urea Cas No. 17526–94–2, Technical Bulletin.

XP–002188701, "Studies on the characterization of ureas as latent accelerators for dicyandiamide–cured epoxy resin", Huang, Jifu, Liang, Xian, Zhang, Baolong: Ding, Peiyuna;Du Zongile.

* cited by examiner

*Primary Examiner*—Robert Dawson
*Assistant Examiner*—D. Aylward
(74) *Attorney, Agent, or Firm*—Gregory M. Hill

(57) ABSTRACT

A clear coat dicyandiamide cured epoxy powder coating for non-metallic substrates wherein the finish coat is visually haze-free as a result of the addition of a small amount of an aromatic substituted urea compound. Non-metallic substrates, such as brass, cannot withstand extremely high temperatures which are required to cure well known powder coatings. However, coating systems which cure at lower temperatures often produce a haze within the finish clear coat. The present invention alleviates this problem.

9 Claims, No Drawings

THERMOSETTING EPOXY POWDER COATINGS HAVING IMPROVED DEGASSING PROPERTIES

CROSS REFERENCE TO RELATED PATENT APPLICATIONS

This is a non-provisional application of prior pending U.S. provisional application Ser. No. 60/246,654 filed Nov. 8, 2000.

The subject invention relates to a thermosetting epoxy powder coating composition and method of use thereof. More particularly, this invention relates to an epoxy powder coating which is adapted to prevent the generation of a haze within a clear coat film finish formed therefrom during thermal curing at low temperatures.

Non-ferrous metals, such as brass and copper, are utilized in industry as components in the manufacture of machines and other such devices as well as in the manufacture of furniture and cabinets as hinges and handles. Items which are more decorative than functional, such as candle holders, lamp components and the like, may also be made with such metals. These non-ferrous metals generally require a clear coat finish to enhance their luster and appearance and to provide protection against handling, wear and tear or adverse environmental factors. Solvent-borne liquid coatings have been employed in the past, but they fail to provide the desired level of performance. Solvent-borne formulations also contain high levels of hazardous volatile organic compounds which evaporate during the setting and curing of the coating. Due to environmental regulations these vaporized organic solvents must be trapped, isolated and collected to prevent their release into the environment. This is a very costly operation.

Fusion bonded, thermosetting powder coating compositions have also been employed to coat non-ferrous parts. Powder coatings offer a number of advantages over liquid coatings. For instance, corrosion and scratch resistance is much superior to that of liquid coatings. Further, powder coatings are virtually free of the harmful fugitive organic solvents normally present in liquid coatings.

Many non-ferrous components, such as brass or brass plated zinc die cast parts, experience outgassing upon heating, especially at the higher temperatures normally associated with traditional thermosetting epoxy based coatings. This condition will cause permanent discoloration or scarring of the metal finish. In order to prevent such an undesirable result, cure temperatures below 350° F. are most preferred.

Among the commercially available low temperature cure thermosetting powder coatings, glycidyl methacrylate (GMA) powder coatings have seen widespread use in businesses such as the brass die cast or brass finishing industries. GMA compounds offer coatings with exceptional smoothness and clarity. However, their use presents a number of drawbacks, such as, poor substrate adhesion and a relatively high cost. As a consequence, attempts have been made to replace GMA materials with traditional thermosetting epoxy coatings, which offer improved adhesion and a lower relative cost. While this has been a significant step forward in this industry, one problem is that, with the standard cure system, e.g. utilizing dicyandiamide, the curing of these coatings at the desired low temperature cure conditions very often leads to the generation of an undesirable visible haze in the powder coating finish.

Clear coat finishes on brass parts should be clear enough so as to permit the distinctness of the brass surface to show through visually unimpeded. In dicyandiamide cured epoxy clear coat systems, a visibly detectable milky haze will appear in the finish coating when this resin system is cured at low temperatures. This milkiness, which is unmelted dicyandiamide, distorts the distinctness of the image of the underlying metallic surface.

The problem addressed by the present invention is the elimination of a visually hazy appearance, in epoxy clear coat finishes which are cured with dicyandiamide at the low temperatures required to process non-ferrous metallic substrates. In a first aspect of the invention, there is provided a powder coating composition comprising an epoxy resin, dicyandiamide as the curing agent and an aromatic substituted urea. In a second aspect of the invention, there is provided a method for obtaining a visually haze-free coating on non-ferrous metallic substrates susceptible to degradation when subjected to high temperatures comprising applying the powder coating composition of the present invention on the surface of the substrate and curing the powder coating at a temperature below that which will harm the substrate wherein the resultant cured coating is without visible haze.

Aromatic substituted ureas are known as being latent accelerators for the dicyandiamide cure of epoxy resins. It is surprising, however, that the addition of such a compound to a clear-coat dicyandiamide epoxy based powder coating would substantially eliminate the visually perceptible haze usually present in the finished coat. The preferred aromatic substituted urea is toluene bis dimethyl urea, which may be acquired from CVC Specialty Chemicals, Inc. as OMICURE® U-410. The aromatic substituted ureas of the invention are present in the powder coating formulation in an amount of 0.1 to 5.0 phr, preferably, 0.5 to 2.0 phr.

The resin which may be employed in the practice of this invention is any epoxy which may be applied via a powder coating formulation. Examples include resins produced by the reaction of epichlorohydrin and a bisphenol, such as bisphenol A, epoxy phenol novolac resins, such as ARALDITE® GT-6259, epoxy cresol novolac resins, and 4,4'-isopropylidenediphenol/epichlorohydrin resins, such as Ciba-Geigy's GT-7013 and GT-7072.

The curing agent used in this powder coating system is dicyandiamide. This curing agent may be commercially acquired from SKW Chemicals under the tradename Dyhard 100S. Dicyandiamide is added to the powder coating composition in an amount up to 8 phr (the amount of epoxy resin in the powder coating composition is equal to 100 parts;

levels of other components are calculated as parts relative to 100 parts of the resin: hence, "X" phr, or "parts per hundred"). Preferably, the amount of dicyandiamide is from 2 to 8 phr and, more preferably, from 4 to 6 phr.

The powder coating composition of the present invention may also contain additives traditionally found in such coatings, such as, dry flow additives, flow control agents, leveling agents, degassing agents, antioxidants, UV absorbers, light stabilizers, etc.

The cure temperatures of the powder coating of the present invention may vary somewhat depending upon the specific ingredients employed and the specific substrate being coated. However, since the substrates being coated are susceptible to outgassing and/or degradation upon heating, the cure temperatures must be below 350° F. Therefore, it is necessary that the powder coating of this invention be formulated to cure to a thermoset state at temperatures below 350° F., and preferably below 325° F., within commercially acceptable processing times, such as for 30 minutes or less, while still producing a haze-free clear coating.

Powder coatings of this invention may be prepared in the usual manner. First, an intimate mixture is formed by dry blending together all of the formulation ingredients in a mixer. The dry blend is then melt-blended in a mixing extruder with heating above the melting point of the resin and the other ingredients, so that the extrudate comprises a homogeneous mix of all of the individual powder coating components. After extrusion, the extrudate is rapidly cooled to form solid "chips". These chips are then ground in a mill to the desired particle size. Average particle size for electrostatic application of the powder coating is generally from 20 to 60 microns.

The powder coating formulations of this invention may be applied to target substrates by any conventional powder coating techniques. However, electrostatic spraying is preferred. In electrostatic spray coating, electrostatic spray booths are employed which house banks of corona discharge or triboelectric spray guns and a reclamation system for recycling the overspray powders back into the powder feed system. The substrate is heated, at least on the surface, at the time of application and/or subsequent thereto to a temperature equal to or above the temperature needed to cure the powder coating but below the temperature at which substrate outgassing and/or degradation might occur, in order to cause the powder coating to flow evenly on the substrate surface and subsequently cure the powder resin. Heating can be achieved via infrared ovens, convection ovens, or a combination of both. Infrared ovens, however, are more traditionally employed. Final cure temperatures and oven residence times will vary depending on the coating powder formulation used, the specific substrate and the conditions of use. Nonetheless, the use of the specific formulation and process of the present invention will provide a coating film which has a haze-free uniform appearance.

The powder coating compositions of the present invention are particularly suited for application onto non-ferrous metallic substrates, such as brass, copper, brass-coated zinc die cast materials, and the like, which are susceptible to outgassing and/or degradation upon exposure to excessive heat. These powder coatings are especially suited for application onto brass materials where a non-hazy clear coating is required.

The invention will now be described in greater detail by way of specific examples. The various components of the following formulations were melt-blended together in a single screw extruder at 180° F., allowed to cool, broken into chips and then charged to a Brinkman Mill having a 200 mesh screen to produce a fine powder. Example A represents the formulation of the present invention while the second formulation is for comparison purposes in that it lacks the presence of the aromatic substituted urea. All amounts shown are in phr.

| Material | Example A | Comparative Example |
|---|---|---|
| GT 7013 | 85.0 | 100 |
| GT 7072 | 10.0 | — |
| XU 71944.00L | 5.0 | — |
| Omicure U-410 | 1.0 | — |
| Baysilone Oil | 0.4 | 0.4 |
| Dyhard 100S | 5.0 | 5.0 |
| Dyhard 2MI | — | 0.1 |

Table Notes:
GT 7013 is a type 2 ½ bisphenol A epoxy resin available from Ciba Specialty Chemicals
GT 7072 is a type 2 bisphenol A epoxy resin available from Ciba Specialty Chemicals
XU 71944.00L is a modified bisphenol A epoxy resin available from Dow Chemical
Omicure U-410 is toluene bis dimethyl urea available from CVC Specialty Chemicals
Baysilone Oil is a commercially available polyetherpolysiloxane leveling agent
Dyhard 100S is a dicyandiamide curing agent available from SKW Chemical Company
Dyhard 1MI is a 2-methylimidazole curing agent also available from SKW Chemical Company Each powder formulation was then electrostatically sprayed via a corona discharge gun onto separate polished brass panels in an amount sufficient enough to obtain a 2.5–3.0 mil thick dry film after cure. Each of the above formulations were cured, respectively, at 320° F. and 350° F. for 15 minutes. Each panel was then subjected to observation using a Nikon optical microscope at 200 times magnification. The results are provided in the Table below.

| Property: | Example A | Comparative Example |
|---|---|---|
| Particle of dicyandiamide visible at: | | |
| 320° F. | Small amount of particles present | Substantial amount of particles present |
| 350° F. | No particles present | Substantial amount of particles present |

The results clearly indicate that the addition of a small amount of an aromatic substituted urea to a dicyandiamide cured epoxy resin clear-coat powder coating system substantially eliminates the haziness caused by unmelted dicyandiamide in low temperature cured powder coatings.

We claim:

1. A clear coat powder coating composition comprising an epoxy resin, dicyandiamide as the curing agent and an aromatic substituted urea, wherein the aromatic substituted urea is toluene bis dimethyl urea.

2. The composition of claim 1 wherein the epoxy resin is a product of the reaction of epichlorohydrin and bisphenol.

3. The composition of claim 1 wherein the dicyandiamide is present in an amount of up to 8phr.

4. The composition of claim 1 wherein the aromatic substituted urea is present in an amount of 0.1 to 5.0 phr.

5. A method for obtaining a visually haze-free clear coating on the surface of non-ferrous metallic substrates applying the powder coating composition of claim 1 to the surface of the substrate and curing the powder coating composition at a temperature below that which will harm the substrate.

6. The method of claim 5 wherein the temperature is less than 350° F.

7. The method of claim 5 wherein the non-ferrous metallic substrate is brass.

8. The method of claim 5 wherein the composition is applied onto the surface of the substrate by electrostatic spray coating.

9. A coated non-ferrous metallic substrate produced according to the method of claim 5.

* * * * *